US009503456B1

(12) United States Patent
Lindberg et al.

(10) Patent No.: US 9,503,456 B1
(45) Date of Patent: Nov. 22, 2016

(54) VIDEO CHAT ABUSE DETECTION BASED ON EXTERNAL CONTEXT

(71) Applicant: Google Inc., Mountain View, CA (US)

(72) Inventors: Jonas Erik Lindberg, Stockholm (SE); Matthew John Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/602,523

(22) Filed: Jan. 22, 2015

(51) Int. Cl.
*H04L 9/00* (2006.01)
*H04L 29/06* (2006.01)
*G06F 17/30* (2006.01)

(52) U.S. Cl.
CPC ........... *H04L 63/10* (2013.01); *G06F 17/3053* (2013.01); *H04L 65/403* (2013.01)

(58) Field of Classification Search
CPC combination set(s) only.
See application file for complete search history.

(56) References Cited

U.S. PATENT DOCUMENTS

| 7,142,651 | B2 | 11/2006 | Ronen et al. | |
|---|---|---|---|---|
| 2008/0177841 | A1* | 7/2008 | Sinn | H04L 12/585 709/206 |
| 2011/0055309 | A1 | 3/2011 | Gibor et al. | |
| 2012/0296965 | A1* | 11/2012 | Srivastava | G06Q 50/01 709/204 |
| 2015/0101026 | A1* | 4/2015 | Kraus | H04L 63/102 726/4 |

FOREIGN PATENT DOCUMENTS

WO 0072563 A1 11/2000

OTHER PUBLICATIONS

Poel, M. et al., "Meeting Behavior Detection in Smart Environments: Nonverbal Cues that Help to Obtain Natural Interaction," IEEE 2008, 6 pages.
Villatoro-Tello, E. et al., "A Two-step Approach for Effective Detection of Misbehaving Users in Chats," Notebook for PAN at CLEF 2012, 12 pages.
Xing, X. et al., "SafeVchat: Detecting Obscene Content and Misbehaving Users in Online Video Chat Services," in Proceedings of the 20th International World Wide Web Conference (WWW'11), Hyderabad, IND, Jan. 2011, 11 pages.

* cited by examiner

*Primary Examiner* — Beemnet Dada
(74) *Attorney, Agent, or Firm* — Remarck Law Group PLC

(57) ABSTRACT

A server-implemented technique can include obtaining external context parameters indicative of an external context of a video chat session, calculating an abuse score based on the external context parameters, the abuse score being indicative of a likelihood the video chat session is abusive, and comparing the abuse score to an abuse score threshold. When the abuse score exceeds an abuse score threshold, the server can transmit, to a reviewer computing device, a request for a human reviewer to review a recorded portion of the video chat session for abuse. When the reviewer computing device returns a response indicating that the human reviewer deemed the video chat session to be abusive, the server can modify a profile of a participant in the abusive video chat session to obtain a modified profile, and generate an output based on the modified profile.

20 Claims, 2 Drawing Sheets

VIDEO CHAT ABUSE DETECTION BASED ON EXTERNAL CONTEXT

FIELD

The present disclosure generally relates to video chat sessions and, more particularly, to techniques for video chat abuse detection based on participant behavior.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Video chat sessions can include a wide array of participants spanning multiple age groups and multiple regions of the world. Thus, when a video chat session is open to the public, inappropriate or abusive interactions may occur. For example, children may be involved in a video chat session with older users. Inappropriate topics or information can also be involved, such as pornography.

SUMMARY

A computer-implemented technique is presented. The technique can include obtaining, at a server having one or more processors, external context parameters indicative of an external context of a video chat session, the external context parameters including at least one of: (i) a number of participants in the video chat session, (ii) peak audio levels in the video chat session, (iii) attributes of one or more speakers in the video chat session, (iv) a geo-location of each participant, (v) an age of each participant, (vi) a gender of each participant, (vii) a muted status for audio and/or video for each participant, and (viii) a number of viewing windows selected as a primary window by the participants. The technique can include calculating, at the server, an abuse score based on the external context parameters, the abuse score being indicative of a likelihood the video chat session is abusive, and comparing, at the server, the abuse score to an abuse score threshold indicative of an acceptable likelihood that the video chat session is not abusive. When the abuse score exceeds the abuse score threshold, the server can (i) obtain a recorded portion of the video chat session for a predetermined duration, and (ii) output, to a reviewer computing device, a request for a human reviewer to review the recorded portion of the video chat session for abuse. In response to the request, the server can receive, from the reviewer computing device, a response indicative of whether the human reviewer determined the video chat session to be abusive based on his/her review of the recorded portion. When the human reviewer deemed the video chat session to be abusive, the server can modify a trust score for each participant to obtain modified trust scores, each trust score being indicative of a likelihood that the corresponding participant would participate in abusive video chat sessions, wherein each trust score modification is indicative of the corresponding participant's role in the abusive video chat session. The server can also restrict access by the participants to future video chat sessions based on their modified trust scores.

Another computer-implemented technique is also presented. The technique can include obtaining, at a server having one or more processors, external context parameters indicative of an external context of a video chat session, calculating, at the server, an abuse score based on the external context parameters, the abuse score being indicative of a likelihood the video chat session is abusive, and comparing, at the server, the abuse score to an abuse score threshold indicative of an acceptable likelihood that the video chat session is not abusive. When the abuse score exceeds the abuse score threshold, the server can transmit, to a reviewer computing device, a request for a human reviewer to review a recorded portion of the video chat session for abuse. In response to the request, the server can receive, from the reviewer computing device, a response indicative of whether the human reviewer determined the video chat session to be abusive based on his/her review of the recorded portion. When the human reviewer deemed the video chat session to be abusive, the server can modify a profile of a participant in the abusive video chat session to obtain a modified profile. The server can also generate an output based on the modified profile.

In some implementations, modifying the profile to obtain the modified profile includes modifying, by the server, a trust score indicative of a likelihood that the participant would participate in abusive video chat sessions, wherein a degree of the trust score modification is indicative of the participant's role in the abusive video chat session, and wherein the server generates the output based on the modified trust score.

In some implementations, the output restricts the participant from joining future video chat sessions when the modified trust score is less than a threshold indicative of a minimum acceptable trustworthiness for video chat sessions.

In other implementations, the output causes a short messaging system (SMS) identity verification process to be initiated for the user.

In some implementations, the technique further comprises when the human reviewer determines that the video chat session is not abusive based on their review of the recorded portion, adjusting, by the server, at least one of (i) the abuse scoring based on the external context parameters and (ii) the abuse score threshold.

In some implementations, the external context parameters include a number of participants in the video chat session, wherein a greater number of participants is indicative of a higher likelihood that the video chat session is abusive.

In other implementations, the external context parameters include peak audio levels in the video chat session, wherein lower peak audio levels are indicative of a higher likelihood that the video chat session is abusive.

In yet other implementations, the external context parameters include at least one of (i) a number of speaker participants in the video chat session and (ii) a frequency of change between the one or more speaker participants in the video chat session.

In yet other implementations, the external context parameters include at least one of (i) geo-location of each participant and (ii) age of each participant, wherein larger differences in geo-locations and ages between participants are each indicative of a higher likelihood that the video chat session is abusive.

In still other implementations, the external context parameters include at least one of (i) a muted status for audio and/or video for each participant and (ii) a number of viewing windows selected as a primary window by the participants, wherein a larger number of muted statuses and a smaller number of primary viewing windows are each indicative of a higher likelihood that the video chat session is abusive.

A server having one or more processors configured to perform operations is also presented. The operations can include obtaining external context parameters indicative of an external context of a video chat session, calculating an abuse score based on the external context parameters, the abuse score being indicative of a likelihood the video chat session is abusive, and comparing the abuse score to an abuse score threshold indicative of an acceptable likelihood that the video chat session is not abusive. When the abuse score exceeds the abuse score threshold, the server can transmit, to a reviewer computing device, a request for a human reviewer to review a recorded portion of the video chat session for abuse. In response to the request, the server can receive, from the reviewer computing device, a response indicative of whether the human reviewer determined the video chat session to be abusive based on his/her review of the recorded portion. When the human reviewer deemed the video chat session to be abusive, the server can modify a profile of a participant in the abusive video chat session to obtain a modified profile. The server can also generate an output based on the modified profile.

In some implementations, modifying the profile to obtain the modified profile includes modifying a trust score indicative of a likelihood that the participant would participate in abusive video chat sessions, wherein a degree of the trust score modification is indicative of the participant's role in the abusive video chat session, and wherein the server generates the output based on the modified trust score.

In some implementations, the output restricts the participant from joining future video chat sessions when the modified trust score is less than a threshold indicative of a minimum acceptable trustworthiness for video chat sessions.

In other implementations, the output causes a short messaging system (SMS) identity verification process to be initiated for the user.

In some implementations, the operations further comprise when the human reviewer determines that the video chat session is not abusive based on their review of the recorded portion, adjusting at least one of (i) the abuse scoring based on the external context parameters and (ii) the abuse score threshold.

In some implementations, the external context parameters include a number of participants in the video chat session, wherein a greater number of participants is indicative of a higher likelihood that the video chat session is abusive.

In other implementations, the external context parameters include at least one of (i) peak audio levels in the video chat session, (ii) a number of speaker participants in the video chat session and (iii) a frequency of change between the one or more speaker participants in the video chat session, wherein lower peak audio levels are indicative of a higher likelihood that the video chat session is abusive.

In yet other implementations, the external context parameters include at least one of (i) geo-location of each participant and (ii) age of each participant, wherein larger differences in geo-locations and ages between participants are each indicative of a higher likelihood that the video chat session is abusive.

In still other implementations, the external context parameters include at least one of (i) a muted status for audio and/or video for each participant and (ii) a number of viewing windows selected as a primary window by the participants, wherein a larger number of muted statuses and a smaller number of primary viewing windows are each indicative of a higher likelihood that the video chat session is abusive.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, inappropriate or abusive video chat sessions can occur due to the worldwide reach of the Internet. Conventional screening techniques involve monitoring internal context of the video chat sessions by a third-party. The term "internal context" refers to the actual content and interactions within the video chat sessions. Third-party monitoring of the internal context of the video chat sessions, however, diminishes user privacy. Accordingly, techniques are presented for video chat abuse detection based on external context. As used herein, the term "abuse" can refer to interaction that society would deem inappropriate or unsavory, as well as any interaction that violates a user agreement associated with the video chat session. Examples of video chat abuse include children interacting with adults, such as those located in another country, as well as pornographic content. As used herein, the term "external context" can refer to any context of the video chat session outside of the content of the video chat session itself. By utilizing external context of the video chat session to detect video chat abuse, user privacy is maintained.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and whether information is collected about the user and used by a content server.

Figure 1:
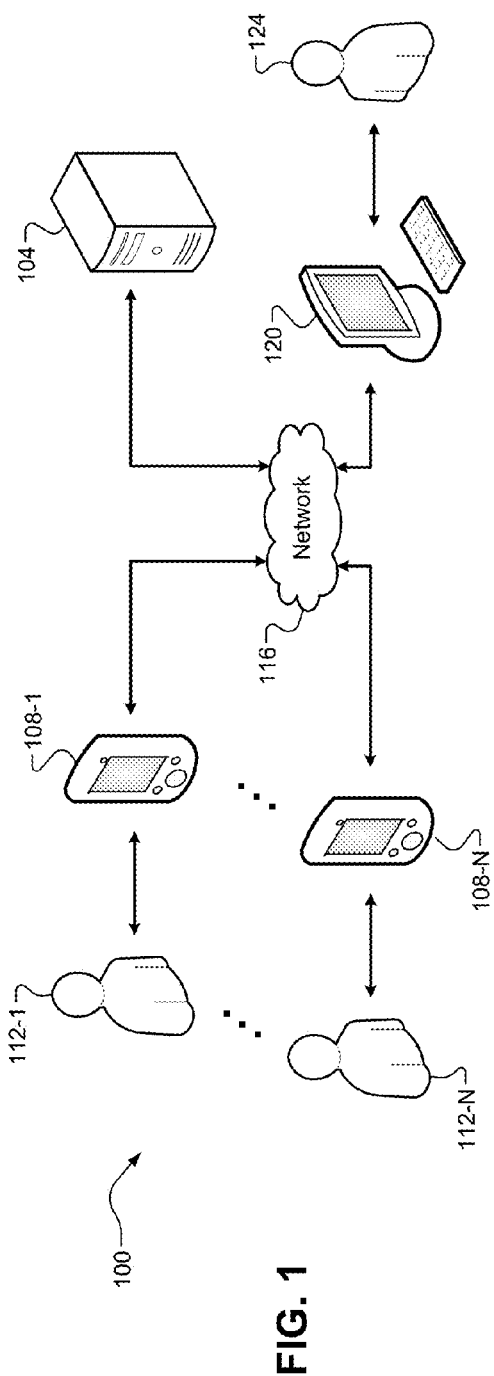
FIG. 1 is a diagram of a computing network including an example server according to some implementations of the present disclosure.

Referring now to FIG. 1, a diagram of a computing network 100 is illustrated. The computing network 100 can include an example server 104 according to some implementations of the present disclosure. As used herein, the term "server" can refer to any suitable hardware computer server, as well as both a single server and multiple servers operating in a parallel or distributed architecture. The server 104 can be configured to detect abusive video chat sessions based on its external context. Upon verification by a human reviewer, the server 104 can be configured to modify user profiles (e.g., trust scores) based on participation/roles in the abusive video chat session. This information can then be utilized to control access to future video chat sessions, such as restricting access to users having a history of participating in abusive video chat sessions. This information could also be used to request additional verification of the identity of a particular user 112, such as via short messaging system (SMS) text messaging.

The video chat session can be initiated between at least two of a plurality of computing devices 108-1 ... 108-N (N>1, collectively "computing devices 108"). The computing devices 108 can be associated with a plurality of users or participants 112-1 ... 112-N (collectively "users 112" or "participants 112"). In one implementation, the server 104 can host the video chat session, although another server host the video chat session. Examples of the computing devices 108 include a desktop computer or a mobile computing device (as shown), such as a laptop computer, a tablet computer, a mobile phone, and wearable technology, such as a smartwatch computing device or an eyewear computing device. The computing device 108 and the server 104 can be in communication via a network 116. The network 116 can include a local area network (LAN), a wide area network (WAN), or a combination thereof.

A reviewer computing device 120 associated with a human reviewer 124 can also be in communication with the server 104. The reviewer computing device 120 can be a same or similar computing device as computing devices 108. Specifically, the server 104 can transmit a request to the reviewer computing device 120 requesting that the human reviewer 124 review a recorded portion of the video chat session. Upon the review by the human reviewer 124, the reviewer computing device 120 can transmit his/her determination (i.e., abusive or not abusive) back to the server 104. The server 104 can then utilize this response to selectively modify the profiles/trust scores associated with the users 112. The server 104 may also tune the abuse detection parameters based on the verification by the human reviewer 124. For example, abuse detection parameters causing false positives may be adjusted or given less weight.

Figure 2:
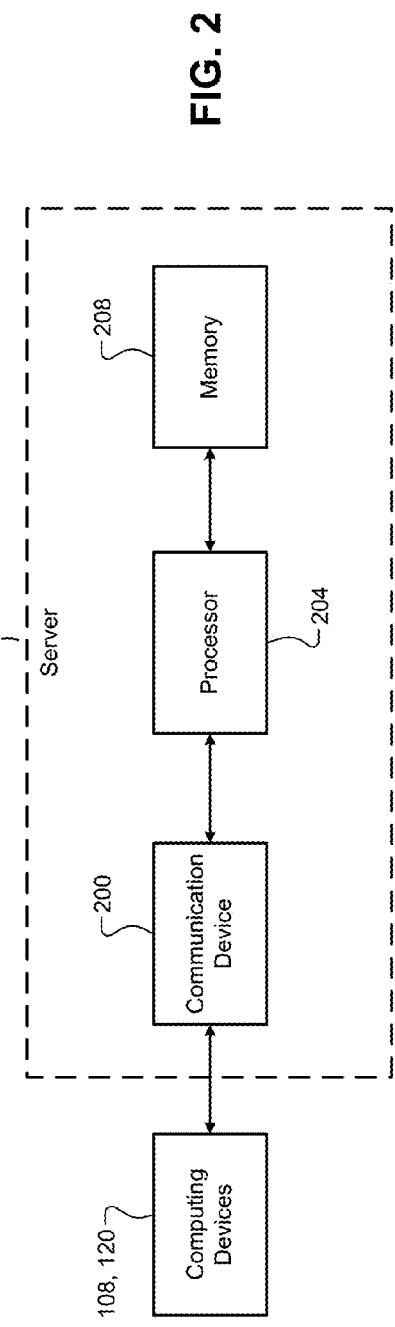
FIG. 2 is a functional block diagram of the example server of FIG. 1.

Referring now to FIG. 2, a functional block diagram of the server 104 is illustrated. It should be appreciated that the computing device 108 can have the same or similar structure, in addition to other possible components (keyboard/display, touch display, etc.). The server 104 can include a communication device 200, a processor 204, and a memory 208. The term "processor" as used herein can refer to both a single processor and multiple processors operating in a parallel or distributed architecture. The communication device 200 can include any suitable communication components (e.g., a transceiver) for communication via the network 116. The memory 208 can be any suitable storage medium (flash, hard disk, etc.) for storing information at the server 104. The processor 204 can control operation of the server 104 and can implement at least a portion of the techniques of the present disclosure, which are described in greater detail below.

For a given video chat session, the server 104 can obtain external context parameters indicative of an external context of the video chat session. The video chat session can be hosted by the server 104 or another server. The external context parameters can be obtained by the server 104 or received from another source such as another server. Each external context parameter can be indicative of an external context of the video chat session. Examples of the external context parameters can include, but are not limited to, (i) a number of participants in the video chat session, (ii) peak audio levels in the video chat session, (iii) attributes of one or more speaker participants in the video chat session, (iv) a geo-location of each participant, (v) an age of each participant, (vi) a gender of each participant, (vii) a muted status for audio and/or video for each participant, and (viii) a number of viewing windows selected as a primary window by the participants.

A greater number of participants can be indicative of a higher likelihood that the video chat session is abusive. For example, hundreds of users 108 may participate in a video chat session to view pornographic material. Similarly, lower peak audio levels can also be indicative of a higher likelihood that the video chat session is abusive. For example, zero or low peak audio levels can be indicative of the participants viewing pornographic material and not conversing. The number of speakers and frequency of speaker change can be indicative of abusive as well as non-abusive video chat sessions, depending on the scenario. For example, a single speaker could be presenting to a large group of participants in a non-abusive video chat session. Similarly, for example, multiple speakers with a high frequency of speaker changes could be found in non-abusive video game-related video chat sessions.

Large differences in geo-location and age between participants can both be indicative of a higher likelihood that the video chat session is abusive. Participant gender can also be considered, such as in conjunction with age. For example, children interacting with adults can be inappropriate, and female children interacting with male adults or children in general interacting with adults in other countries can be even more inappropriate. Exceptions can occur, however, such as when the children and the adults are related, which could be determined from their respective accounts or social network profiles. Larger numbers of muted statuses for audio and/or video for each participant and smaller numbers of viewing windows selected as a primary window by the participants can both be indicative of a higher likelihood that the video chat session is abusive. For example, each participant may mute their audio and have the same primary window when viewing pornographic material in an abusive video chat session.

Based on the external context parameters, the server 104 can calculate an abuse score indicative of a likelihood the video chat session is abusive. This can include utilizing a trained classifier or other suitable model to generate the abuse score. The server 104 can then compare the abuse score to an abuse score threshold indicative of an acceptable likelihood that the video chat session is not abusive. When the abuse score is less than or equal to the abuse score threshold, the video chat session is determined to not be abusive. When the abuse score exceeds the abuse score threshold, however, human review for verification can occur. This can include the server 104 transmitting, to the reviewer computing device 120, a request for the human reviewer 124 to review a recorded portion (e.g., a snippet) of the video chat session for abuse. This recorded portion can be obtained by the server 104 or another server and may have a predefined duration (e.g., 30 seconds).

When the human reviewer 124 determines that the video chat session is not abusive based on his/her review of the recorded portion, the server 104 may adjust at least one of (i) the abuse scoring based on the external context parameters (e.g., adjust or re-weight the trained classifier or model) and (ii) the abuse score threshold (e.g., decrease the abuse score threshold). These actions can help decrease false positive abuse detections, thereby saving costs by saving the human reviewer 124 time. When the human reviewer 124 determines the video chat session to be abusive, on the other hand, the server 104 can modify profile(s) of user(s) 112 in the abusive video chat session to obtain modified profile(s). The degree of the modification may depend on the specific participant's role in the video chat session.

For example, a creator of the abusive video chat session may receive a larger modification to their profile, whereas a contributor to the abusive video chat session may receive a smaller modification to their profile. Some participants, however, may receive no modification of their profiles, such as participants that join and then quickly leave the abusive video chat session. This classification and the instance of abuse can be associated with their profile for future use. In one implementation, modifying the profile of a specific user 112 includes modifying a trust score associated with their profile. Other parameters can be utilized in determining this trust score, such how long the profile has been active (e.g., new profile=untrusted). The trust score could then be used in providing access to users 108 to video chat sessions.

This trust score can be indicative of a likelihood that the specific user would participate in abusive video chat sessions. Similar to the discussion above, a degree of the trust score modification can be based on the participant's role in the abusive video chat session. The server 104 can generate an output based on the modified profile(s) (e.g., the modified trust score(s)) of the user(s) 112. In one implementation, the output can include restricting the user 112 from joining future video chat sessions, such as when their modified trust score is less than a threshold indicative of a minimum acceptable trustworthiness for video chat sessions. If their modified trust score is extremely low, their account could be deleted. Another example output is initiating an SMS identity verification process for the specific user 108 to verify their identity and thereby restore their trust score to an acceptable level.

Figure 3:
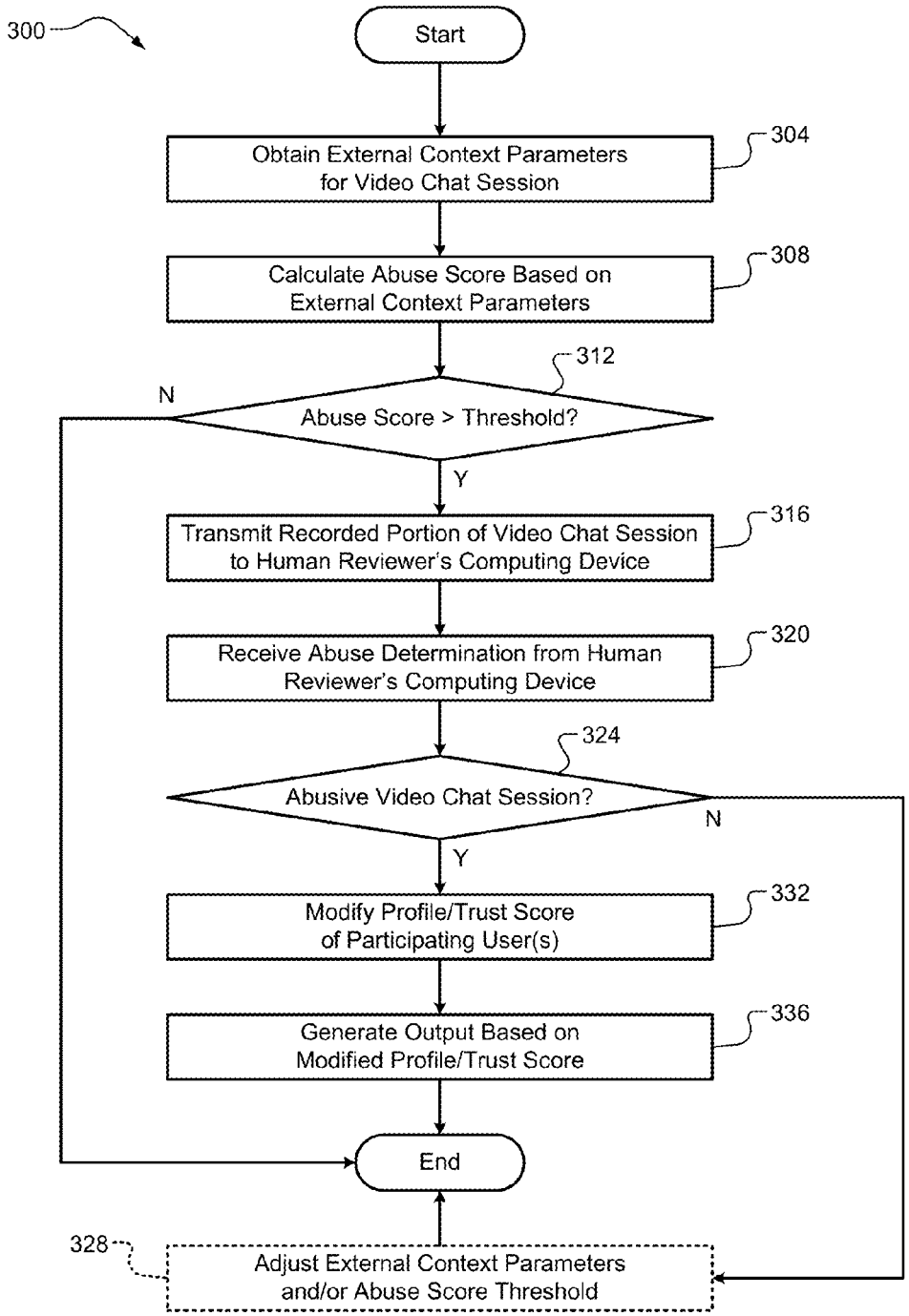
FIG. 3 is a flow diagram of an example technique for detecting video chat abuse based on external context.

Referring now to FIG. 3, a flow diagram of an example technique 300 for detecting video chat abuse based on external context is illustrated. At 304, the server 104 can obtain external context parameters indicative of an external context of a video chat session. At 308, the server 104 can calculate an abuse score based on the external context parameters, the abuse score being indicative of a likelihood the video chat session is abusive. At 312, the server 104 can determine whether the abuse score exceeds an abuse score threshold. When the abuse score does not exceed the abuse score threshold, the server 104 can determine that the video chat session is not abusive and the technique 300 can end. When the abuse score does exceed the abuse score threshold, however, the server 104 can transmit, to the reviewer computing device 120, a request for human reviewer 124 to review at least a portion of the video chat session for abuse at 316.

At 320, the server 104 can receive the response from the reviewer computing device 120 specifying the abuse determination of the human reviewer 124. When the human reviewer 124 determined that the video chat session is not abusive at 324, the server 104 can optionally adjust the abuse detection parameters at 328 and the technique 300 can end. When the human reviewer 124 determined that the video chat session is abusive at 324, however, the server 104 can modify a profile (e.g., a trust score) of a user 112 participating in the video chat session at 332. In one implementation, this adjustment is based on their role in the video chat session (e.g., creator vs. contributor). At 336, the server 104 can generate an output based on the modified profile/trust score. Examples of the output include requiring additional identify verification, such as via SMS messaging, or restricting access to future video chat sessions for users 112 having history of abuse/untrustworthiness. The technique 300 can then end.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   obtaining, at a server having one or more processors, external context parameters indicative of an external context of a video chat session, the external context parameters including at least one of:
   (i) a number of participants in the video chat session,
   (ii) peak audio levels in the video chat session,
   (iii) attributes of one or more speakers in the video chat session,
   (iv) a geo-location of each participant,
   (v) an age of each participant,
   (vi) a gender of each participant
   (vii) a muted status for audio and/or video for each participant, and
   (viii) a number of viewing windows selected as a primary window by the participants;
   calculating, at the server, an abuse score based on the external context parameters, the abuse score being indicative of a likelihood the video chat session is abusive;
   comparing, at the server, the abuse score to an abuse score threshold indicative of an acceptable likelihood that the video chat session is not abusive;
   when the abuse score exceeds the abuse score threshold:
   (i) obtaining, by the server, a recorded portion of the video chat session for a predetermined duration, and
   (ii) outputting, from the server to a reviewer computing device, a request for a human reviewer to review the recorded portion of the video chat session for abuse;
   in response to the request, receiving, at the server from the reviewer computing device, a response indicative of whether the human reviewer determined the video chat session to be abusive based on his/her review of the recorded portion;
   when the human reviewer deemed the video chat session to be abusive, modifying, at the server, a trust score for each participant to obtain modified trust scores, each trust score being indicative of a likelihood that the corresponding participant would participate in abusive video chat sessions, wherein each trust score modification is indicative of the corresponding participant's role in the abusive video chat session; and restricting, by the server, access by the participants to future video chat sessions based on their modified trust scores.

2. A computer-implemented method, comprising:

obtaining, at a server having one or more processors, external context parameters indicative of an external context of a video chat session;

calculating, at the server, an abuse score based on the external context parameters, the abuse score being indicative of a likelihood the video chat session is abusive;

comparing, at the server, the abuse score to an abuse score threshold indicative of an acceptable likelihood that the video chat session is not abusive;

when the abuse score exceeds the abuse score threshold, transmitting, from the server to a reviewer computing device, a request for a human reviewer to review a recorded portion of the video chat session for abuse;

in response to the request, receiving, at the server from the reviewer computing device, a response indicative of whether the human reviewer determined the video chat session to be abusive based on his/her review of the recorded portion;

when the human reviewer deemed the video chat session to be abusive, modifying, at the server, a profile of a participant in the abusive video chat session to obtain a modified profile; and generating, by the server, an output based on the modified profile.

3. The computer-implemented method of claim 2, wherein modifying the profile to obtain the modified profile includes modifying, by the server, a trust score indicative of a likelihood that the participant would participate in abusive video chat sessions, wherein a degree of the trust score modification is indicative of the participant's role in the abusive video chat session, and wherein the server generates the output based on the modified trust score.

4. The computer-implemented method of claim 3, wherein the output restricts the participant from joining future video chat sessions when the modified trust score is less than a threshold indicative of a minimum acceptable trustworthiness for video chat sessions.

5. The computer-implemented method of claim 3, wherein the output causes a short messaging system (SMS) identity verification process to be initiated for the user.

6. The computer-implemented method of claim 2, further comprising when the human reviewer determines that the video chat session is not abusive based on their review of the recorded portion, adjusting, by the server, at least one of (i) the abuse scoring based on the external context parameters and (ii) the abuse score threshold.

7. The computer-implemented method of claim 2, wherein the external context parameters include a number of participants in the video chat session, wherein a greater number of participants is indicative of a higher likelihood that the video chat session is abusive.

8. The computer-implemented method of claim 2, wherein the external context parameters include peak audio levels in the video chat session, wherein lower peak audio levels are indicative of a higher likelihood that the video chat session is abusive.

9. The computer-implemented method of claim 2, wherein the external context parameters include at least one of (i) a number of speaker participants in the video chat session and (ii) a frequency of change between the one or more speaker participants in the video chat session.

10. The computer-implemented method of claim 2, wherein the external context parameters include at least one of (i) geo-location of each participant and (ii) age of each participant, wherein larger differences in geo-locations and ages between participants are each indicative of a higher likelihood that the video chat session is abusive.

11. The computer-implemented method of claim 2, wherein the external context parameters include at least one of (i) a muted status for audio and/or video for each participant and (ii) a number of viewing windows selected as a primary window by the participants, wherein a larger number of muted statuses and a smaller number of primary viewing windows are each indicative of a higher likelihood that the video chat session is abusive.

12. A server having one or more processors configured to perform operations comprising:

obtaining external context parameters indicative of an external context of a video chat session;

calculating an abuse score based on the external context parameters, the abuse score being indicative of a likelihood the video chat session is abusive;

comparing the abuse score to an abuse score threshold indicative of an acceptable likelihood that the video chat session is not abusive;

when the abuse score exceeds the abuse score threshold, transmitting, to a reviewer computing device, a request for a human reviewer to review a recorded portion of the video chat session for abuse;

in response to the request, receiving, from the reviewer computing device, a response indicative of whether the human reviewer determined the video chat session to be abusive based on his/her review of the recorded portion;

when the human reviewer deemed the video chat session to be abusive, modifying a profile of a participant in the abusive video chat session to obtain a modified profile; and generating an output based on the modified profile.

13. The server of claim 12, wherein modifying the profile to obtain the modified profile includes modifying a trust score indicative of a likelihood that the participant would participate in abusive video chat sessions, wherein a degree of the trust score modification is indicative of the participant's role in the abusive video chat session, and wherein the server generates the output based on the modified trust score.

14. The server of claim 13, wherein the output restricts the participant from joining future video chat sessions when the modified trust score is less than a threshold indicative of a minimum acceptable trustworthiness for video chat sessions.

15. The server of claim 13, wherein the output causes a short messaging system (SMS) identity verification process to be initiated for the user.

16. The server of claim 12, wherein the operations further comprise when the human reviewer determines that the video chat session is not abusive based on their review of the recorded portion, adjusting at least one of (i) the abuse scoring based on the external context parameters and (ii) the abuse score threshold.

17. The server of claim 12, wherein the external context parameters include a number of participants in the video chat session, wherein a greater number of participants is indicative of a higher likelihood that the video chat session is abusive.

18. The server of claim 12, wherein the external context parameters include at least one of (i) peak audio levels in the video chat session, (ii) a number of speaker participants in the video chat session and (iii) a frequency of change between the one or more speaker participants in the video chat session, wherein lower peak audio levels are indicative of a higher likelihood that the video chat session is abusive.

19. The server of claim 12, wherein the external context parameters include at least one of (i) geo-location of each participant and (ii) age of each participant, wherein larger differences in geo-locations and ages between participants are each indicative of a higher likelihood that the video chat session is abusive.

20. The server of claim 12, wherein the external context parameters include at least one of (i) a muted status for audio and/or video for each participant and (ii) a number of viewing windows selected as a primary window by the participants, wherein a larger number of muted statuses and a smaller number of primary viewing windows are each indicative of a higher likelihood that the video chat session is abusive.

\* \* \* \* \*